United States Patent Office 3,242,226
Patented Mar. 22, 1966

3,242,226
PROCESS FOR HYDROGENATING ACETYLENES
IN THE PRESENCE OF DIOLEFINS
Werner Albert Bauch and Walter James Porter, Jr.,
Baton Rouge, La., assignors to Esso Research and
Engineering Company, a corporation of Delaware
No Drawing. Filed Apr. 25, 1961, Ser. No. 105,301
4 Claims. (Cl. 260—681.5)

This invention relates to the selective hydrogenation of acetylenes in the presence of diolefins by contact with a catalyst comprising palladium supported on alumina.

More specifically this invention relates to the selective hydrogenation of acetylenes contained in a butadiene bearing stream by contacting the stream in vapor phase with hydrogen gas and a catalyst consisting essentially of an alumina base having supported thereon less than about 0.2 wt. percent of palladium based on alumina.

One of today's more valuable hydrocarbon compounds is butadiene which is derivable from several processes such as the dehydrogenation of butane and butene. More economical and convenient sources for this product are the various cracking processes such as steam cracking wherein relatively high molecular weight hydrocarbons such as gas oil and naphtha fractions as well as intermediate molecular weight fractions are converted to lower molecular weight unsaturated hydrocarbons including butadiene. Fractionating the crude steam cracked product produces among other cuts a $C_4$ fraction containing substantial amounts of butanes, butenes and butadienes, predominantly 1,3-butadiene. Such $C_4$ fractions will usually contain contaminating amounts of $C_3$ and $C_4$ acetylenes, in particular methyl, ethyl and vinyl acetylene which are present in amounts of from 1000–5000 p.p.m.

Since butadiene cannot be economically separated from butane and butene by commercial fractionating techniques, industry resorts to more elaborate separation processes, one of which constitutes extraction by aqueous cuprous ammonium acetate referred to generally as the CAA process. The CAA process for the separation of butadiene from other $C_4$ hydrocarbons cannot tolerate appreciable amounts of acetylenes in the order of magnitude expressed without considerable operational difficulty. Acetylenes are extremely reactive and polymerize readily under extraction-stripping conditions to cause foaming as well as plugging of the lines. Further, copper acetylides tend to form during the process presenting a safety hazard due to the explosive nature of these compounds. For these and other reasons it is considered essential to reduce the acetylene level in the butadiene-bearing stream to below about 500 p.p.m. prior to extraction of the butadiene.

Acetylenes hydrogenate very easily under relatively mild conditions so that there is little problem in converting these highly unsaturated compounds to hydrocarbons of lesser unsaturation. On the other hand, butadiene is also highly sensitive to hydrogenation conditions so that the problem of converting acetylenes in the presence of butadiene is mainly one of selectivity.

There exist at least three acceptable techniques for selectively removing acetylenes from butadiene-bearing streams which, in general terms, can be defined as extraction, liquid phase selective hydrogenation and vapor phase selective hydrogenation. Extraction processes such as with weak solutions of CAA have been used but are difficult to operate with butadiene-bearing streams containing greater than 2000 p.p.m.–5000 p.p.m. of the more reactive acetylenes such as vinyl acetylene. On the other hand, selective hydrogenation processes employing appropriate catalysts are in many cases effective with butadiene-bearing streams containing substantial amounts of acetylenes, and are best when the acetylenes are of the more reactive variety such as vinyl acetylene. In some instances it is desirable to use liquid phase selective hydrogenation conditions in order to avoid the expense of gasifying the feed and subsequently condensing back to the liquid for liquid phase extraction processes. In many other instances it is desirable to use vapor phase conditions for the selective hydrogenation process. As an example, small CAA units are often run on a vapor-liquid phase system wherein the gaseous butadiene-bearing stream is scrubbed with aqueous CAA solutions to selectively extract the butadiene. In such cases the gaseous $C_4$ fraction, if liquid phase selective hydrogenation were employed, would have to be condensed and then gasified. Utilizing a vapor phase selective hydrogenation process, the acetylene-reduced $C_4$ stream could be carried from the selective hydrogenation process through the CAA butadiene extraction unit in vapor phase without condensing and gasifying operations. Additionally, the active catalyst concentrations required for efficient liquid phase hydrofining are high with respect to the present process wherein hydrofining may be carried out in vapor phase at low active catalyst concentrations. By active catalyst concentrations, it is meant the weight percent of active metal hydrogenation catalyst, i.e., palladium, based on the support used.

The acetylene contaminated butadiene-bearing stream may be derived from steam cracking or other sources. It will be essentially a $C_4$ hydrocarbon stream containing substantial amounts of butadiene, e.g., 10–60 wt. percent and there may also be present from 40–90 wt. percent butenes and butanes. This stream will be contaminated with one or more of the $C_3$ and $C_4$ acetylenes in total amounts of from 1000–5000+ p.p.m. A typical $C_4$ hydrocarbon stream from a steam cracking process contains 38 wt. percent butadienes, 56 wt. percent butenes, 4 wt. percent butanes, 1000 p.p.m. methyl acetylenes, 600 p.p.m. ethyl acetylene and 1700 p.p.m. vinyl acetylene. It is to be understood that the essential novelty herein resides in the removal or selective hydrogenation of $C_3$–$C_4$ acetylenes in the presence of butadiene. The presence of butanes, butenes or other non-diolefinic hydrocarbons is not necessary to the successful operation of the claimed process. If it is desired to selectively hydrogenate acetylenes in a stream consisting of butadiene and acetylenes, this can be done in accordance with the described procedure.

In accordance with this invention the acetylene contaminated butadiene-bearing stream is fed in vapor phase into a conventional tower fully or partially packed with a catalyst consisting essentially of elemental palladium supported on alumina. The concentration of palladium may vary between 0.01 and 0.2 weight percent based on alumina. The cost of palladium is of course high and plays an important role in the overall economic picture of the selective hydrogenation process described herein.

For this reason there is every incentive to employ the lowest concentrations of palladium possible consistent with obtaining the desired selective hydrogenation. It has been found that the largest percentage of acetylenes may be converted with minimum butadiene losses using palladium concentrations of 0.02–0.07 weight percent on alumina. Utilizing concentrations substantially below the broader range expressed does not produce the desired conversion of acetylenes whereas amounts over this concentration fail to increase the selective hydrogenation of acetylenes beyond that obtained in the ranges specified herein and promotes an undesired conversion of butadiene to more saturated compounds. Any standard means known in the art for impregnating the alumina with elemental palladium may be employed. A typical procedure comprises soaking the alumina support in a solution of a palladium salt, such as aqueous palladium chloride for a time sufficient to permit adsorption of the desired palladium concentration. The impregnated alumina may then be treated at 25 to 650° C. in the presence of hydrogen to reduce ionic palladium to its elemental state. Residual chloride may be washed out or left on the base since it does not seem to affect the efficiency of this catalyst insofar as the selective removal of acetylenes is concerned. The alumina base may be any standard alumina; however, preferably one having a surface area of from 10 to 250 square meters per gram, e.g., 40 square meters per gram, should be employed. The physical size of the alumina particles may vary over a wide range, e.g., 0.5 mm. to 10 mm. diameter. Alumina suitable as a base for the present catalyst composition may be prepared by decomposing an aluminum alcoholate by techniques well known in the art. It is to be understood that most commercial aluminas sold contain contaminating amounts of magnesium, iron, copper, chromium, silicon and the term "consisting essentially of" as used herein is not intended to exclude compositions of matter containing these contaminants provided that they are not present in large enough quantities to materially affect the reaction mechanism.

To demonstrate the unusually superior results obtainable with the present catalyst, reference is now had to the following Table I which sets forth two comparative runs. In both runs all conditions were held constant with the exception of the specific catalyst employed. In Run 1 the catalyst employed was palladium on high surface area coke base and containing 3 wt. percent of elemental palladium based on coke. In Run 2, the catalyst consisted of 0.03 wt. percent palladium based on alumina having a surface area of 177 square meters. The runs were carried out as follows: The $C_4$ fraction containing 38 wt. percent butadiene, 56 wt. percent butylenes, 4 wt. percent butane (and other saturated paraffins), and 3660 p.p.m. acetylenes, was vaporized at 175 p.s.i.g. by heating to a temperature between 150–300° F. To this butadiene-bearing acetylene contaminated stream there were added the indicated theories of hydrogen, one theory being equal to the amount of hydrogen neecssary to convert all of the acetylenes to hydrocarbons of lesser unsaturation, i.e., butene and propylene. The acetylene contaminated stream admixed with hydrogen was then passed downflow over a bed of the indicated catalyst.

TABLE I

|  | Run No. 1 | Run No. 2 |
| --- | --- | --- |
|  | 3 Wt. Percent Pd on Coke | 0.03 Wt. Percent Pd on $Al_2O^3$ |
| V./v./hr. | 1,200 | 1,500 |
| Temp., ° F. | 229 | 202 |
| Pressure, p.s.i.g. | 210 | 125 |
| $H^2$, Theories | 2.5 | 2.7 |
| Percent of Acetylenes Removed | 33 | 72.5 |
| Butadiene Loss, Percent | 1.4 | 0.6 |
| Surface Area, $M.^2/gm$ | 160 | 177 |

It will be noted from Table I that the 3 wt. percent palladium on coke catalyst effected an acetylene removal of only 33 wt. percent, whereas utilizing a catalyst consisting essentially of 0.03 wt. percent palladium on alumina base there was obtaned a 72.5 wt. percent removal of the acetylene present. At the same time the butadiene losses in Run 1 with the 3 wt. percent palladium on coke catalyst were significantly greater than the butadiene losses in Run 2. This would indicate that while the palladium on coke catalyst is active, it is not selective to the hydrogenation of acetylenes in relation to the catalyst of this invention. In general, the following ranges of operating conditions have been found to be preferred for the purposes of the present invention, all conditions referred to being those within the selective hydrogenation zone. Pressures of 1 p.s.i.g. to 1000 p.s.i.g., more preferably 100 to 300 p.s.i.g.; a temperature between 50° F. to 500° F., more preferably 150 to 250° F.; a throughput rate of 300 to 5000 vapor v./v./hr., more preferably 1000 to 2000 vapor v./v./hr., and a hydrogen theory concentration of between 1.5 and 4, more preferably 2–3 theories.

To demonstrate the effect of hydrogen concentration, reference is now had to Table II which sets forth data from actual comparative runs wherein all variables except the hydrogen theory concentration were held reasonably constant. For these experiments there was employed a catalyst consisting of 0.04 wt. percent of palladium on alumina having a surface area of 177 $m.^2/gm$. The term "v./v./hr." is used herein to mean volumes of gaseous feed at 60° F. and atmospheric pressure per volume of catalyst per hour.

TABLE II

| $H_2$ Theories | V./v./hr. | P.s.i.g. | ° F. | Wt. Percent Acetylenes Removed | Butadiene Loss, Wt. Percent |
| --- | --- | --- | --- | --- | --- |
| 1.4 | 750 | 105 | 190 | 52 | 0.3 |
| 2.7 | 1,500 | 125 | 202 | 72.5 | 0.6 |
| 3.7 | 590 | 180 | 204 | 75 | 3.0 |
| 4.3 | 653 | 180 | 200 | 75 | 4.0 |
| 6.9 | 593 | 180 | 200 | 66 | 4.4 |

Table II discloses that at 1.4 hydrogen theories, extremely small butadiene losses are realized, but acetylenes removal is below the desired level. With 2.7 hydrogen theories butadiene losses are still extremely low and acetylenes removal is within a commercially acceptable range for many purposes even though the contact time as reflected by the v./v./hr. figure was low. As the hydrogen concentration increases, the butadiene losses also increase as expected; however, the amount of acetylenes removal does not substantially deviate from the acetylenes removal using smaller concentrations of hydrogen. In fact, with 6.9 theories of hydrogen, acetylenes removal is substantially below that obtainable with lower concentrations of hydrogen, whereas the butadiene losses are significantly higher.

To further demonstrate the unique characteristics of the claimed catalyst, reference is had to the following Table III which shows a comparison of various catalysts including palladium on alumina with relatively high concentrations of palladium, as well as palladium on other known catalyst bases, such as coke, high and low surface area aluminas, molecular sieves, and the like. Analysis of Table III will evidence the unexpectedly superior results obtainable by resort to this invention.

TABLE III.—CRUDE BUTADIENE HYDROFINING SUMMARY TABLE

| Run No.[1] | Catalyst | | | Wt. Percent C≡ Removed | Wt. Percent C₄≡ Loss | V./v./hr. | P.s.i.g. | °F. | H₂ Th |
| --- | --- | --- | --- | --- | --- | --- | --- | --- | --- |
| | Catalyst Base | Percent Pd | S.A. m.²/gm. | | | | | | |
| 80-87 | Al₂O₃ | 0.034 | 177 | 72.5 | 0.6 | 1,500 | 125 | 202 | 2.7 |
| 80-89 | Coke | 3.0 | 160 | 32.9 | 1.4 | 1,200 | 210 | 229 | 2.5 |
| 80-90 | Al₂O₃ | 6.0 | 177 | 42.2 | 2.8 | 1,000 | 210 | 225 | 4.2 |
| 80-91 | Al₂O₃ | 6.0 | 14 | 65.0 | 2.4 | 1,000 | 60 | 124 | 3.4 |
| 80-93 | 5 A. Molecular Sieve. | | 220 | 65.0 | 2.6 | 1,000 | 210 | 210 | 4.1 |
| 80-95 | Coke | 3.24 | 12 | 67.0 | 2.2 | 470 | 180 | 195 | 4.3 |

[1] All runs in vapor phase.

What is claimed is:

1. A process for selectively converting acetylenes contained in a butadiene bearing stream which comprises contacting an essentially $C_4$ hydrocarbon stream containing at least 10 wt. percent butadiene and from 1,000 to 5,000 p.p.m. of $C_3$ and $C_4$ acetylenes in vapor phase with hydrogen and a catalyst consisting essentially of 0.01 to 0.2 wt. percent palladium on an adsorptive aluminum base at a temperature between 50 and 500° F. and a pressure between 1 and 1,000 p.s.i.g. for a time sufficient to convert at least a major portion of the acetylenes to hydrocarbons of lesser unsaturation but insufficient to convert substantial amounts of butadiene to hydrocarbons of lesser unsaturation.

2. A process in accordance with claim 1 wherein said alumina base has a surface area between 10 and 250 square meters per gram and the palladium concentration is between about 0.02 and 0.07 wt. percent based on alumina.

3. A process in accordance with claim 7 wherein the temperature is between 150 and 250° F., the pressure is in the range of 100 to 300 p.s.i.g. and at a rate of from 300 to 5,000 volumes of vaporized stream per volume of total catalyst per hour.

4. A process for selectively converting acetylenes contained in an essentially $C_4$ hydrocarbon stream containing at least 10 wt. percent butadiene and from 1,000 to 5,000 p.p.m. of $C_3$ and $C_4$ acetylenes which comprises contacting said essentially $C_4$ hydrocarbon stream in vapor phase with from 1.5 to 4 theories of hydrogen and a catalyst consisting essentially of 0.01 to 0.2 wt. percent palladium on an adsorptive alumina base at a temperature between 150 and 250° F. and a pressure between 100 to 300 p.s.i.g. and at a rate from 300 to 5,000 volumes of vaporized stream per volume of total catalyst per hour for a time sufficient to convert at least a major portion of the acetylenes to hydrocarbons of lesser unsaturation but insufficient to convert substantial amounts of butadiene to hydrocarbons of lesser unsaturation.

References Cited by the Examiner
UNITED STATES PATENTS

| | | | |
| --- | --- | --- | --- |
| 2,391,004 | 12/1945 | Breuer | 260—681.5 |
| 2,814,653 | 11/1957 | Hogan et al. | 260—681.5 |
| 2,946,829 | 7/1960 | Likins et al. | 260—676 |
| 3,003,008 | 10/1961 | Fleming et al. | 260—681.5 |
| 3,075,917 | 1/1963 | Kronig et al. | 260—677 |
| 3,076,858 | 2/1963 | Frevel et al. | 260—681.5 |
| 3,098,882 | 7/1963 | Arnold | 260—677 |
| 3,113,980 | 12/1963 | Robinson | 260—683 |

PAUL M. COUGHLAN, *Primary Examiner.*

ALPHONSO D. SULLIVAN, *Examiner.*